US012084096B2

(12) United States Patent
Ramasundaram et al.

(10) Patent No.: US 12,084,096 B2
(45) Date of Patent: Sep. 10, 2024

(54) RAILCAR HATCH COVER

(71) Applicant: FreightLucid, LLC, Dallas, TX (US)

(72) Inventors: Bharanikumar Ramasundaram, Flower Mound, TX (US); James W. Talley, Jr., Frisco, TX (US); Michael D. Rainone, Palestine, TX (US); Calvin C. Schlau, Winona, TX (US); Caleb N. Nehls, Tyler, TX (US)

(73) Assignee: FREIGHTLUCID, LLC, Dallas, TX (US)

( * ) Notice: Subject to any disclaimer, the term of this patent is extended or adjusted under 35 U.S.C. 154(b) by 1028 days.

(21) Appl. No.: 16/999,377

(22) Filed: Aug. 21, 2020

(65) Prior Publication Data

US 2021/0053593 A1     Feb. 25, 2021

Related U.S. Application Data

(60) Provisional application No. 62/889,798, filed on Aug. 21, 2019.

(51) Int. Cl.
B61D 5/00       (2006.01)
B61D 17/16      (2006.01)
B65D 90/00      (2006.01)
G01F 23/296     (2022.01)
G01L 1/22       (2006.01)
(Continued)

(52) U.S. Cl.
CPC ............ B61D 5/08 (2013.01); B61D 17/16 (2013.01); G01F 23/296 (2013.01); G01L 1/22 (2013.01); B61D 5/02 (2013.01); B61D 7/02 (2013.01)

(58) Field of Classification Search
CPC ... B61D 5/02; B61D 5/08; B61D 7/02; B61D 17/16; G01F 23/296; G01L 1/22
See application file for complete search history.

(56) References Cited

U.S. PATENT DOCUMENTS

| 7,199,488 | B1 | 4/2007 | Baker |
| 7,688,218 | B2 | 3/2010 | LeFebvre et al. |
| 8,060,264 | B2 | 11/2011 | Oestermeyer et al. |
| 8,212,685 | B2 | 7/2012 | LeFebvre et al. |
| 8,244,411 | B2 | 8/2012 | Baker |

(Continued)

FOREIGN PATENT DOCUMENTS

| CN | 108909935 A | 11/2018 |
| DE | 10241401 A1 | 3/2004 |

(Continued)

OTHER PUBLICATIONS

International Preliminary Report on Patentability for PCT Patent Application No. PCT/US2020/047445, mailed Mar. 3, 2022.

(Continued)

Primary Examiner — Robert J McCarry, Jr.
(74) Attorney, Agent, or Firm — Baker Botts L.L.P.

(57) ABSTRACT

According to some embodiments, a hatch cover for an opening in a container comprises a body comprising a plate member for covering the opening in the container, a seal on the underside of the body for sealing the body to the container, and one or more pressure sensors disposed between the seal and the body. The one or more pressure sensors are operable to detect a pressure between the body and the container and are communicably coupled to a hatch status device operable to detect a change in pressure between the body and the container. Some embodiments may include a fill level sensor.

19 Claims, 14 Drawing Sheets

(51) Int. Cl.
　　*B61D 5/02*　　　(2006.01)
　　*B61D 7/02*　　　(2006.01)

(56) References Cited

U.S. PATENT DOCUMENTS

| | | |
|---|---|---|
| 8,812,175 B2 | 8/2014 | Baker |
| 8,823,537 B2 | 9/2014 | LeFebvre et al. |
| 9,026,281 B2 | 5/2015 | Murphy et al. |
| 9,365,223 B2 | 6/2016 | Martin et al. |
| 9,918,673 B2 | 5/2018 | Martin et al. |
| 2002/0190068 A1 | 12/2002 | Sisk et al. |
| 2004/0100379 A1 | 5/2004 | Boman et al. |
| 2008/0252515 A1* | 10/2008 | Oestermeyer ...... H04B 7/18513 73/861.85 |
| 2010/0300185 A1 | 12/2010 | Toth et al. |

FOREIGN PATENT DOCUMENTS

| | | | |
|---|---|---|---|
| JP | 2003-172496 A | 6/2003 | |
| JP | 2005-537995 A * | 12/2005 | ............. B65D 90/10 |

OTHER PUBLICATIONS

International Search Report and Written Opinion for PCT Patent Application No. PCT/US2020/047445, mailed Dec. 4, 2020; 12 pages.

EP Extended Search Report in EP Application No. 20855376.8-1005/4017776 PCT/US2020047445, dated Jul. 20, 2023.

Canadian Patent Office, Official Action in Application No. 3,151,811, dated Mar. 13, 2024.

* cited by examiner

(12) United States Patent

RAILCAR HATCH COVER

RELATED APPLICATION

This application claims priority to U.S. Provisional Application Ser. No. 62/889,798, entitled "RAILCAR HATCH COVER," filed Aug. 21, 2019.

TECHNICAL FIELD OF THE INVENTION

This disclosure relates generally to railcars, and more particularly to a hatch cover for a railcar.

BACKGROUND

Tank cars and hopper cars are types of railroad cars designed to transport liquid, gaseous, and bulk commodities such as oil, railbit, plastic beads, grain, cement, etc. Tank cars, generally, include a horizontal tank mounted to a flat car. Hopper cars include a bulk container, such as a rectangular bin, mounted to a flat car.

Both kinds of cars may include a top dome with hatch openings to provide access to the railcar (e.g., for access to the tank, to load product in the hopper, etc.) and a discharge valve or bulk gates at the bottom of the railcar.

The commodities loaded into tank and hopper cars are generally products that need to be kept free of contamination during transport. To ensure the integrity of the commodities stored in the tank and hopper car, the top dome includes a sealed hatch cover that inhibits the passage of potential contaminants (e.g., water) into the tank. A locking bar may also be attached to the hatch cover to prevent inadvertent and/or unauthorized access to the hatch.

SUMMARY

Railcars, such as hopper cars and tank cars, may include one or more hatch openings on top of the railcar that provide access to the railcar. To ensure the integrity of the commodities stored in the tank and/or hopper cars, the hatch openings are sealed by hatch cover that inhibits the passage of potential contaminants (e.g., water) into the tank or hopper. The hatch cover may also include a locking bar to prevent inadvertent and/or unauthorized access to the hatch.

While a locking bar is generally effective in most cases, a determined person could remove the locking bar to gain access to the contents of the car or displace the locking bar. Under such circumstances, loss or contamination of the product may not be detected until the car reaches the final destination.

Furthermore, during repeated uses, the seals and other latches used to seal the hatch cover may begin to fail. Additionally, human error may lead to hatches that are inadvertently left open or left in an unsealed position. Any of these conditions can ultimately lead to contamination of the product.

Accordingly, particular embodiments include hatch covers with one or more sensors to monitor a status of the hatch cover and/or the contents of the railcar.

According to some embodiments, a hatch cover for an opening in a container (e.g., hopper car, tank car, etc.) comprises a body comprising a plate member for covering the opening in the container, a seal on an underside of the body for sealing the body to the container, and one or more pressure sensors disposed between the seal and the body. The one or more pressure sensors are operable to detect a pressure between the body and the container. The one or more pressure sensors are communicably coupled to a hatch status device operable to detect a change in pressure between the body and the container. The one or more pressure sensors may comprise force sensitive resistors.

In particular embodiments, the hatch status device is operable to transmit pressure information received from the one or more pressure sensors to a remote location. The one or more pressure sensors may be communicably coupled to the hatch status device via a wired or wireless connection.

In particular embodiments, the hatch cover further comprises a fill level sensor disposed on the underside of the body and operable to detect a fill level of a commodity within the container. The fill level sensor is communicably coupled to the hatch status device operable to detect a change in the fill level of the container. The fill level sensor may comprise an ultrasonic transducer.

According to some embodiments, a method is for use with a hatch cover for an opening in a container. The hatch cover comprises one or more sensors. The method comprises detecting a first output value from the one or more sensors of the hatch cover, detecting a second output value from the one or more sensors of the hatch cover, determining the second output value is different than the first output value, and transmitting an alert to a remote location.

The sensors may comprise pressure sensors to detect an open or partially open hatch cover and/or fill level sensors to detect a loss of commodity within the container.

Certain embodiments of the railcar hatch cover may provide one or more technical advantages. For example, particular embodiments may detect an open or partially open hatch cover and alert rail personnel, a rail operator, a shipping operator, etc. Some embodiments may detect a change in fill level (e.g., lost commodity) of a railcar and alert rail personnel, a rail operator, a shipping operator, etc.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
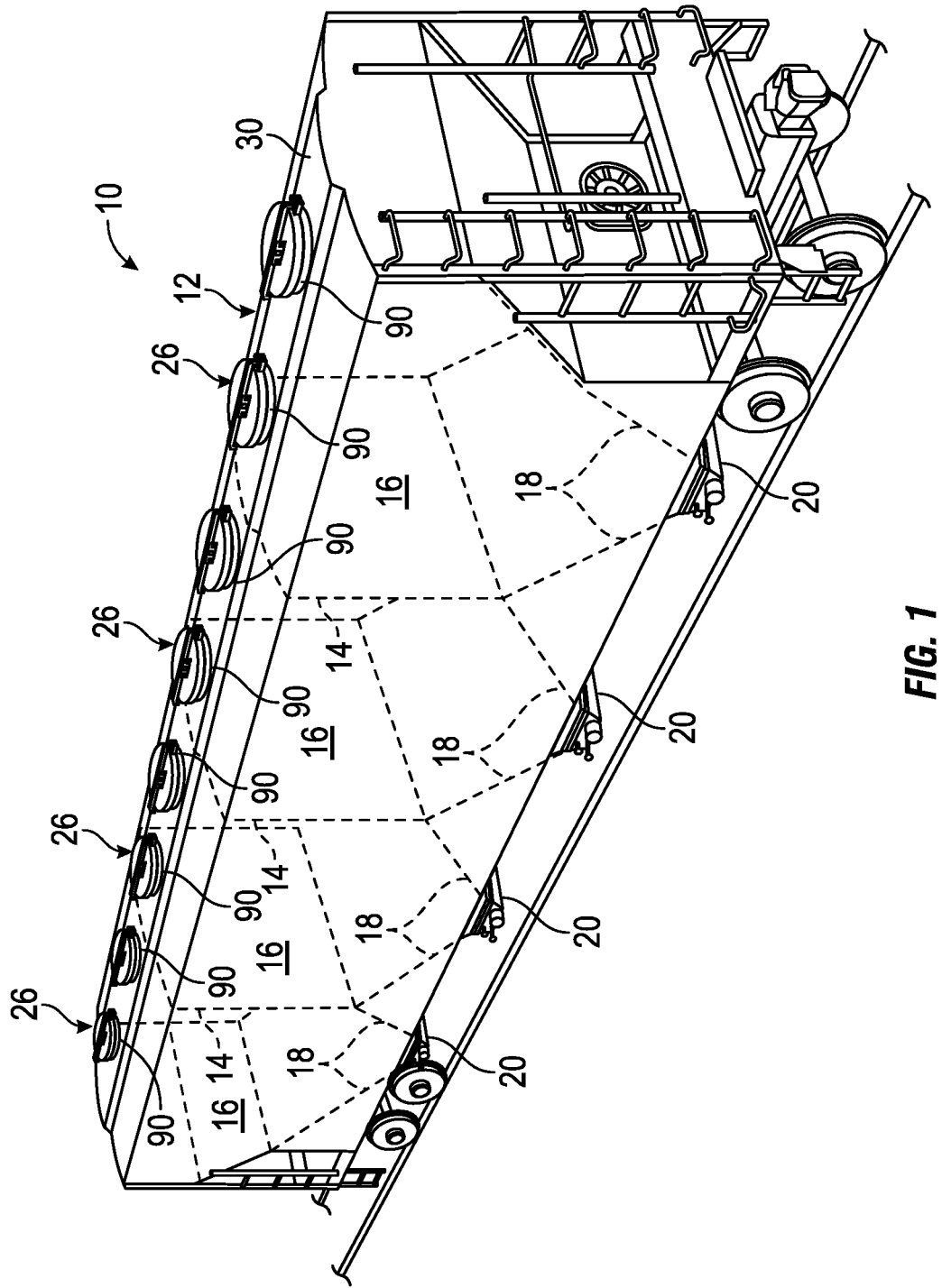
FIG. 1 is a side view of a hopper car with hatches and hatch covers.

Railroad hopper cars generally include one or more hoppers which may hold cargo or lading (e.g., bulk materials) during shipment. Hopper cars frequently transport coal, sand, metal ores, aggregates, grain, plastic pellets, and any other type of lading which may be satisfactorily discharged through openings formed in one or more hoppers.

Railroad tank cars transport bulk liquid commodities, such as oil, ethanol, liquid natural gas, etc. Many tank cars are equipped with a top operating platform that provides a rail operator with access to the top fittings of the tank car, such as various valves, gauges, inlet/outlet connections, manways, and other equipment usually mounted along a top centerline of the tank.

Both kinds of cars may include hatch openings to provide access to the railcar (e.g., for access to the tank, to load product in the hopper, etc.) and a discharge valve or bulk gates at the bottom of the railcar.

The commodities loaded into tank and hopper cars are generally products that need to be kept free of contamination during transport. To ensure the integrity of the commodities stored in the tank and hopper car, the top dome includes a sealed hatch cover that inhibits the passage of potential contaminants (e.g., water) into the tank. The hatch cover may also include a locking bar to prevent inadvertent and/or unauthorized access to the hatch.

While a locking bar is generally effective in most cases, a determined person could remove the locking bar to gain access to the contents of the car or displace the locking bar. Under such circumstances, loss or contamination of the product may not be detected until the car reaches the final destination.

Furthermore, during repeated uses, the seals and other latches used to seal the hatch cover may begin to fail. Additionally, human error may lead to hatches that are inadvertently left open or left in an unsealed position. Any of these conditions can ultimately lead to contamination of the product.

Accordingly, particular embodiments include hatch covers with one or more sensors to monitor a status of the hatch cover and/or the contents of the railcar. Embodiments of the present disclosure and its advantages are best understood by referring to FIGS. 1 through 14 of the drawings, like numerals being used for like and corresponding parts of the various drawings.

Enclosed railway hopper cars are designed to transport dry, bulk materials such as grain, plastic pellets, flour, sugar, and other granular or powdered products. A car may have several hoppers to hold these individual materials. Outlets at the bottom of each hopper allow the materials to exit.

Hatch cover 26 incorporating one or more embodiments described herein is illustrated in FIGS. 1-9. For purposes of illustration, hatch cover 26 is described with respect to enclosed railway hopper car 10. However, a hatch cover incorporating the embodiments described herein may be used with a wide variety of storage containers and/or shipping containers in addition to enclosed railway hopper cars. Also, hatch cover 26 is shown with a generally circular configuration. However, a hatch cover incorporating the embodiments described herein may have a square, rectangular, or any other geometric configuration as required for the associated hatch opening.

FIG. 1 is a side view of a hopper car with hatches and hatch covers. As illustrated, hopper car 10 has a plurality of hoppers 16. Each hopper has at least one hopper outlet 20. Preferably, each hopper outlet 20 is positioned at a bottom end portion of the hopper 16. More than one hopper outlet may be employed.

The interior of each hopper may be defined by substantially vertical upper sidewall portions and sloped lower sidewall portions. For example, hoppers 16 illustrated in FIG. 1 each have an interior defined by four sidewalls. Each sidewall has a substantially vertical upper sidewall portion 14 and a sloped lower sidewall portion 18. Sloped sidewall portions 18 each slope inwardly from respective lower edges of vertical sidewall portions 14 to respective upper edges of hopper outlet 20.

The configuration of the interior of each hopper assists in the exit of material from the hopper. It should be noted that configurations other than that shown in FIG. 1 may be used to accomplish this objective. For example, greater or fewer than four sidewalls may be used. Also, the interior perimeter of hopper 16 and of first outlet portion 20 may comprise shapes other than a square as shown. For example, the interior may be funnel-shaped.

FIG. 1 also illustrates roof 30 of hopper car 10. Roof 30 includes at least one hatch opening 90. Each hopper 16 has at least one associated hatch 90 located at an upper end thereof in roof 30. Each hopper 16 may have more than one hatch 90. Hatch 90 is shown in greater detail in FIGS. 2 and 3. Hatch 90 comprises a hatch opening 91, which is formed in roof 30 above a particular hopper 16. As illustrated, hatch opening 91 has a generally circular shape, but the hatch opening may have other shapes.

Dry, bulk material is generally loaded from a bulk loading facility through the hatches into the respective hopper car. The hatches are then closed, and the hopper car transported to its unloading destination. At the unloading facility the dry, bulk material is then unloaded from the hopper outlet. During both shipment and unloading, it is important to protect the dry, bulk material contained within the hopper car from contamination by external sources.

To protect the contents of the hopper car, the hatches and outlets are generally provided with covers. Each hatch 90 is associated with hatch cover 26. For some applications, hopper car 10 may have four hoppers 16 (as illustrated in FIG. 1) with two or three hatches 90 per hopper 16 formed in roof 30 for use in loading the respective hopper section. FIG. 1 illustrates two hatches 90 for each hopper 16.

Figure 2:
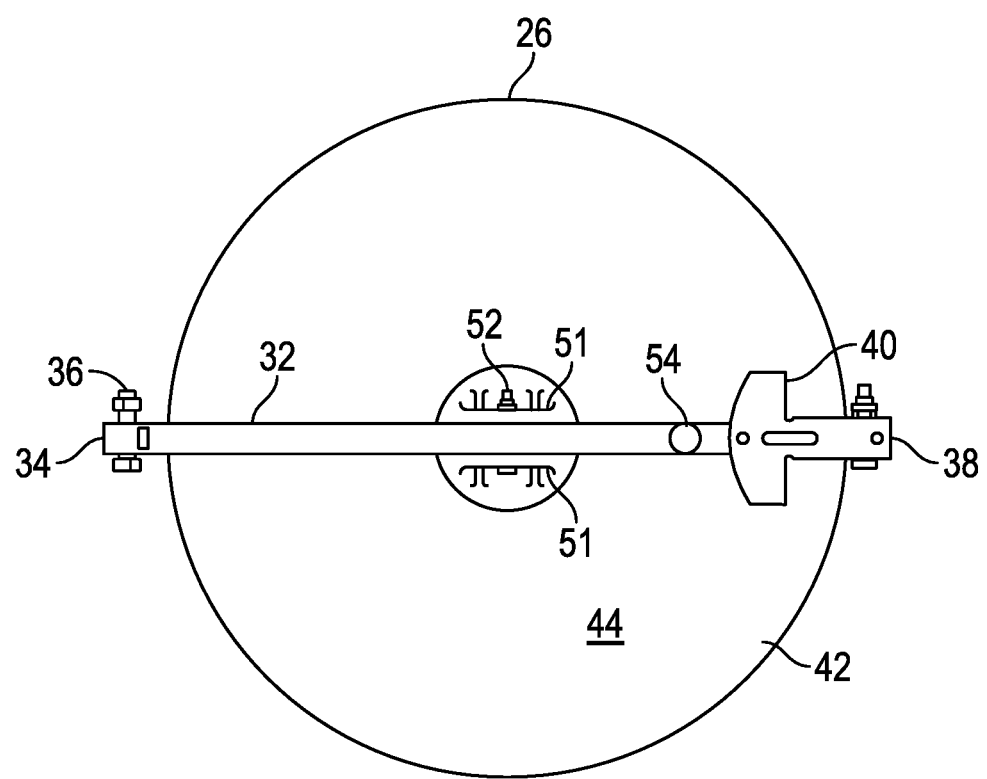
FIG. 2 is a plan view of the hatch cover of FIG. 1.
Figure 3:
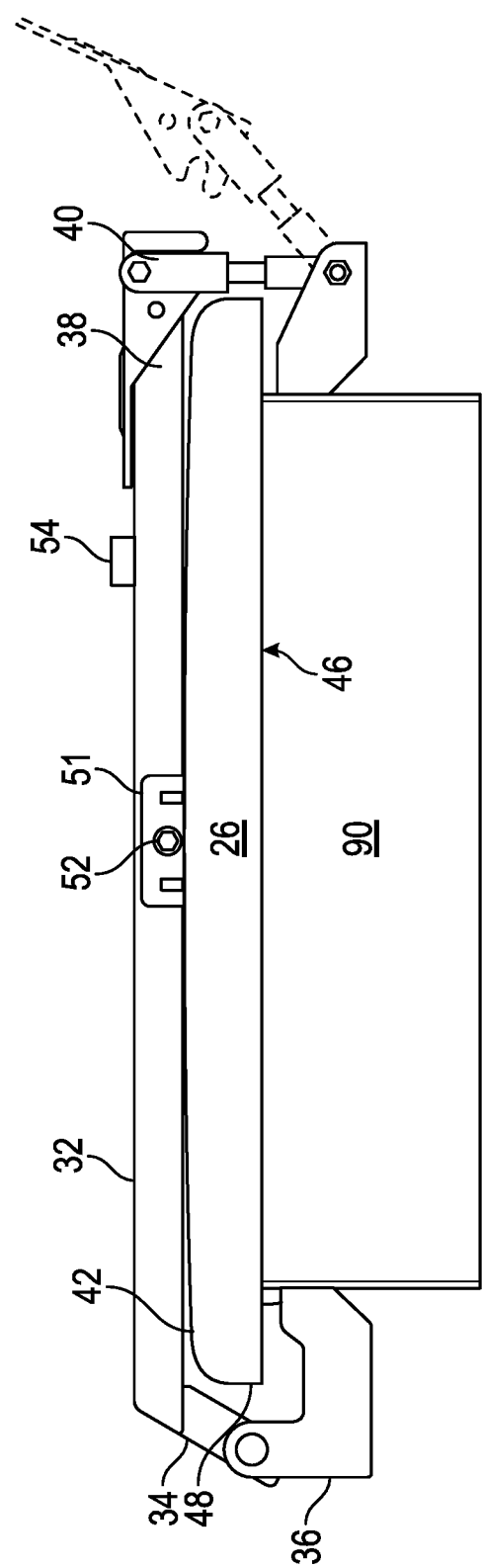
FIG. 3 is an elevation of the hatch cover of FIG. 1.

FIG. 2 is a plan view and FIG. 3 is an elevation view of the hatch cover of FIG. 1. Hatch cover 26 may be connected to an elongated hold down and locking bar 32 which extends diametrically across hatch cover 26. A first end 34 of locking bar 32 may be pivotally attached to hinge assembly 36 to facilitate rotation of hatch cover 26 between a first, closed position and a second, open position. A second end 38 of locking bar 32 includes latching mechanism 40 which is used to releasably secure hatch cover 26 in the first, closed position. Various types of lock down bars and latching mechanisms may be satisfactorily used with a hatch cover according to the embodiments described herein.

Hatch cover 26 includes a generally circular plate member 42 having an outer surface 44 and an inner surface 46. Outer rim 48 is may be formed as an integral part of circular plate member 42 to extend from a periphery of plate 42. Outer rim 48 is substantially perpendicular to plate 48 and cooperates with plate 42 to form a cup-shaped member.

As stated above, other shapes of hatches and covers may be used in connection with particular embodiments. Therefore, even though a circular plate member having an annular rim is shown in the figures, these and other elements may have other shapes.

As shown in FIGS. 2 and 3, hatch cover 26 includes a pair of brackets 51 generally located proximate the center of circular plate member 42 and extending outwardly from outer surface 44. Brackets 51 are spaced radially from each other to receive locking bar 32 therebetween. Connecting pin 52 extends between brackets 51 and is used to attach hold down and support bar 32 to hatch cover 26. Connecting pin 52 and brackets 51 cooperate with each other to form a relatively loose pivotal connection between hatch cover 26 and locking bar 32. This facilitates, among other things, equalizing closing forces applied to hatch cover 26 by locking bar 32. Equalizing such closing forces assists in forming a uniform fluid/gas tight seal.

For some applications, locking bar 32, hinge assembly 36 and latching mechanism 40 may be formed from stainless steel or other suitable metal alloys. For other applications, locking bar 32, hinge assembly 36 and latching mechanism 40 may be formed from high strength composite materials such as fiber-reinforced plastic.

An elastomeric bumper 54 may be secured to locking bar 32 for engagement with roof 30 of railway hopper car 10 when hatch cover 26 is in its second, open position to prevent excessive impact between locking bar 32 and roof 30.

As shown in FIGS. 2 and 3, hatch cover 26 has a generally smooth outer surface 44. For some applications, hatch cover 26 is preferably formed from high strength plastic material using injection molding techniques. Alternatively, vented hatch cover 26 may be formed from aluminum, stainless steel, other metal alloys, composite materials or fiber reinforced plastic depending upon the intended application for the resulting hatch cover 26.

Some enclosed railway hopper cars may be unloaded using gravity flow and/or vacuum assisted conveying lines to increase the rate of discharging material from the hopper car. Grain and plastic pellets are examples of dry, bulk material, suitable for loading, transportation and discharge from an enclosed hopper car having gravity and/or vacuum assisted conveying line.

For some applications, enclosed railway hopper cars are provided with a positive pressure, pneumatic system for use in unloading dry, bulk material. For example, some railway hopper cars carrying dry, bulk material are often unloaded by attaching a vacuum assisted conveying line to an outlet gate positioned at the bottom of each hopper section. The primary air flow for the vacuum conveying line is typically obtained from a source exterior to the respective hopper car. To increase material flow from the respective hopper car and to prevent any undesirable difference in pressure between the interior and the exterior of the respective hopper section, a vent path is preferably provided during unloading of the bulk material. Failure to provide a satisfactory vent for each hopper section will reduce the efficiency of the vacuum conveying line and may result in damage from an excessive difference in pressure between the interior and exterior of the respective hopper section. For some applications, the enclosed railway hopper car is fitted with a vented hatch cover.

Hatch covers that include the ability to vent a hopper and/or tank are referred to as vented hatch covers. An example is illustrated in FIG. 4.

Figure 4:
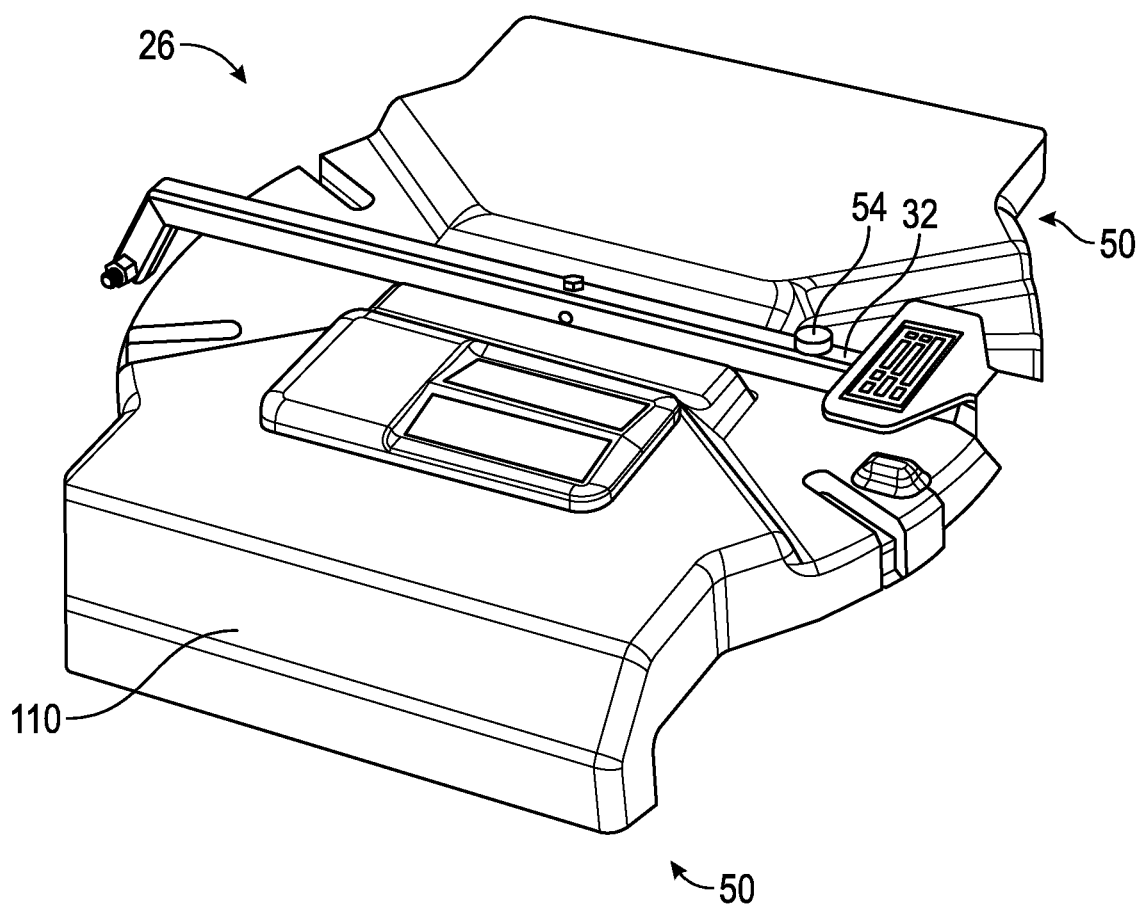
FIG. 4 is a top perspective view of an example vented hatch cover.

FIG. 4 is a top perspective view of an example vented hatch cover. Hatch cover 26 is similar to hatch cover 26 described with respect to FIGS. 1-3 with the addition of air plenums 50. For example, hatch cover body 110 comprises generally circular plate member 42 having an outer surface 44 and an inner surface 46 and outer rim 48, described with respect to FIGS. 2 and 3. Body 110 has a surface area sufficient to cover the opening to the railcar (for example hopper car 10 with hatch 90).

Locking bar 32 is disposed over the body to secure the hatch to the railcar. Locking bar 32 is similar to locking bar 32 described with respect to FIGS. 2 and 3. In addition, locking bar 32 may be locked to inhibit unauthorized access to the contents of the railcar.

Figure 5:
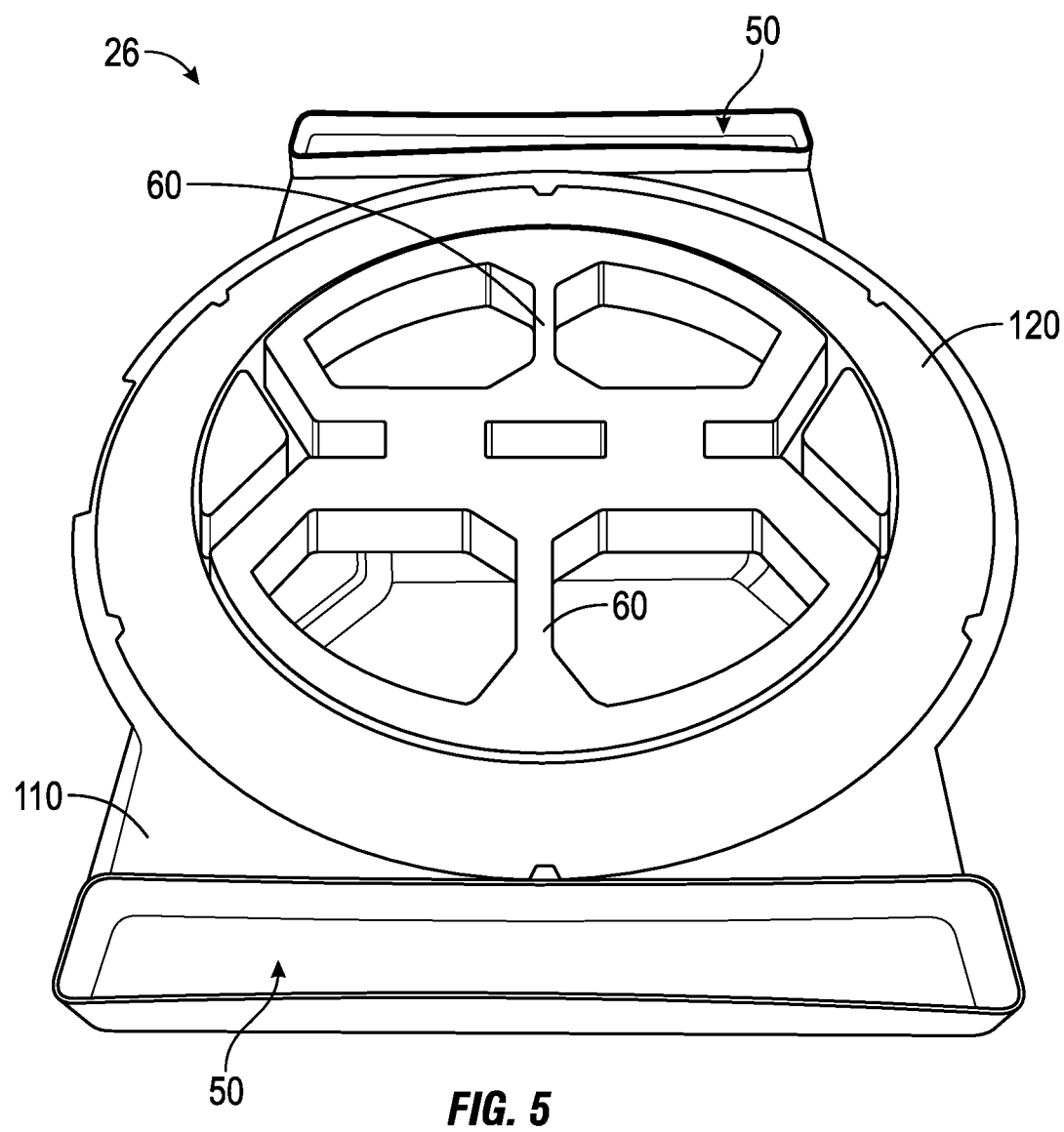
FIG. 5 is an underside perspective view of an example vented hatch cover.

Air plenums 50 are illustrated in more detail with respect to FIG. 5.

FIG. 5 is an underside perspective view of an example vented hatch cover. Hatch cover 26 includes seal 120 on the underside of body 110. When pressed against the opening of the railcar, seal 120 creates a liquid and/or gas tight seal between hatch cover 26 and an opening of the railcar.

Also illustrated are cross-bar members 60. Cross-bar members 60 provide structural support for body 110 while also providing open space that facilitates air flow between the hatch opening and air plenums 50. Some embodiments may include air filters (not illustrated).

Figure 6:
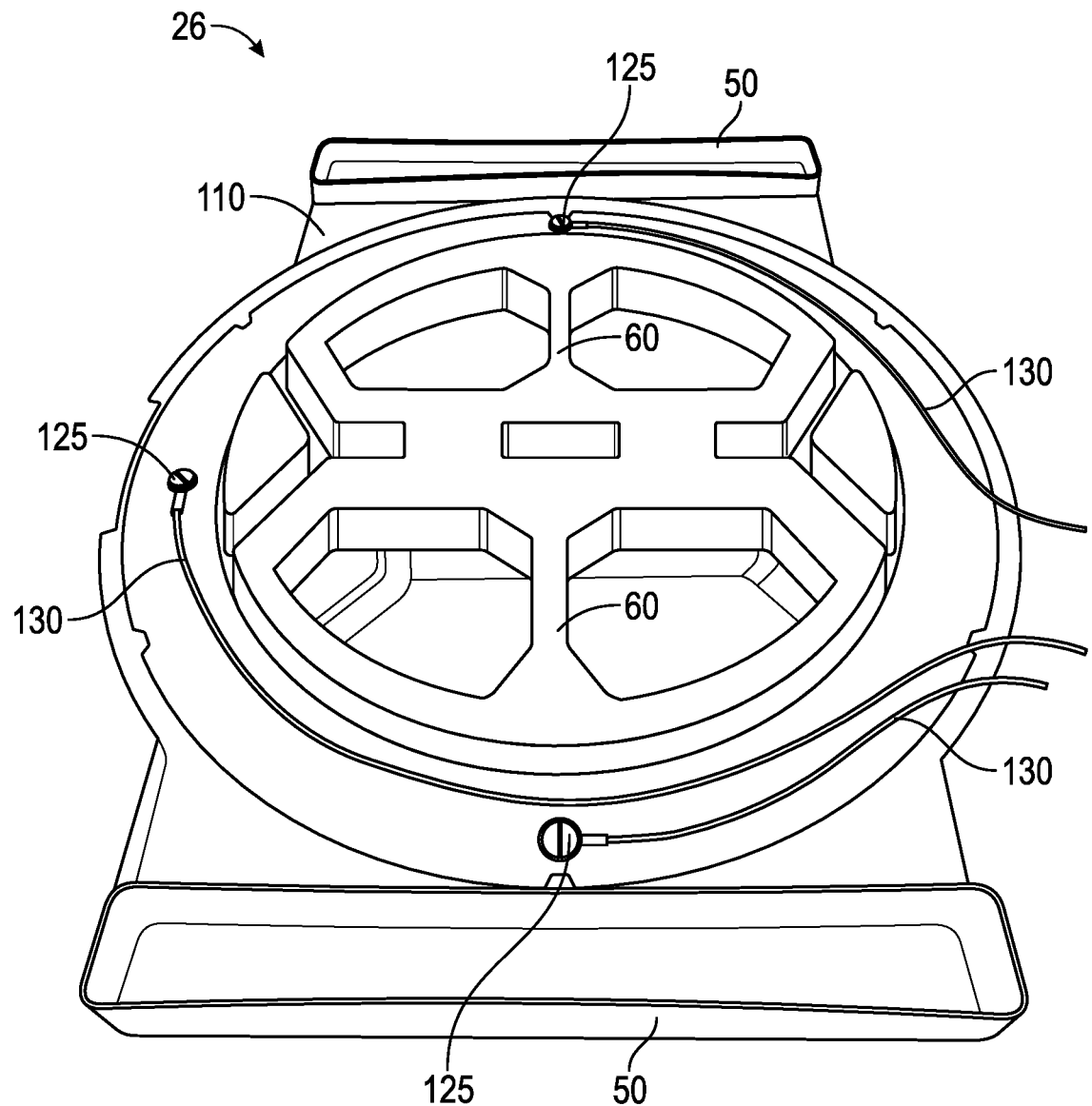
FIG. 6 is an underside perspective view of an example vented hatch cover with the seal removed.

FIG. 6 is an underside perspective view of an example vented hatch cover with the seal removed. For example, hatch cover 26 is similar to hatch cover 26 described with respect to FIG. 5 with seal 120 removed. In some embodiments, a system for determining when the seal is open is incorporated into hatch cover 26.

Disposed on the underside of body 110 are one or more sensors. Some embodiments include pressure sensors 125 disposed between the underside of body 110 and seal 120. In the illustrated example, one or more wires 130 extend from each of the sensors. Wires 130 may be used to transmit electronic signals to and/or from the sensors. The electronic signals may include data and/or commands. In some embodiments, pressure sensors 125 are communicably coupled to a hatch status device via wires 130. In some embodiments, pressure sensors 125 may comprise wireless sensors and may be communicably coupled to hatch status device 135 wirelessly. An example hatch status device is illustrated in FIG. 7.

Figure 7:
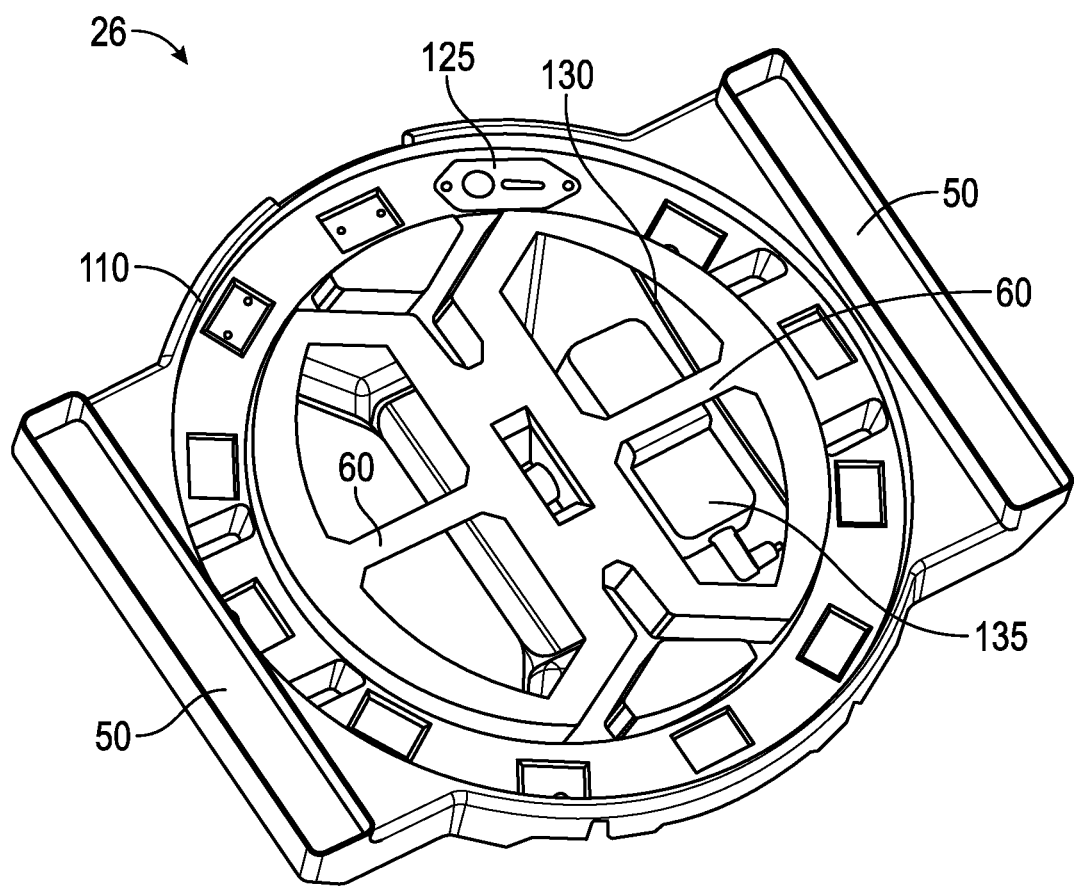
FIG. 7 is another underside perspective view of a hatch cover with the seal removed, according to some embodiments.

FIG. 7 is another underside perspective view of a hatch cover with the seal removed, according to some embodiments. In the illustrated example, pressure sensor 125 is communicably coupled to hatch status device 135 via wires 130.

In some embodiments, hatch status device 135 collects pressure information from pressure sensor 125. Hatch status device 135 may include a transmitter operable to send information related to the pressure determined by pressure sensor 125 to a remote location.

During use, body 110 is moved into a closed position over an opening of the railcar, such as hatch 90 of hopper car 10. Locking bar 32 may be used to create a force against body 110, pressing seal 120 against the edges of the opening. The pressure on the seal creates a liquid and/or gas tight cover over the railcar opening.

Pressure sensor 125, disposed between body 110 and seal 120, detects the increase in pressure when hatch cover 26 is closed and sealed. The detected pressure may be stored in hatch status device 135 as a "sealed" pressure.

After hatch cover 26 is closed and sealed, in some embodiments hatch status device 135 may periodically request pressure information from pressure sensor 125. In other embodiments, pressure sensor 125 may periodically and autonomously send pressure information to hatch status device 135. In some embodiments, pressure sensor 125 may send pressure information to hatch status device 135 upon detecting a change in pressure.

Using the provided pressure information, hatch status device 135 can determine the state of hatch cover 26. In an embodiment, the state of hatch cover 26 is one of open, partially open, or sealed. For example, if the pressure, as determined by the pressure sensors, is substantially the same as the originally measured "sealed" pressure, then the state of the hatch cover is designated as "sealed." If the pressure on the seal significantly deviates from the original sealed pressure, the pressure is evaluated to determine if the hatch cover is open or partially open.

For example, if the detected pressure is at or about a predetermined low pressure, then the state of the hatch cover is designated as "open." If the detected pressure is between a predetermined low pressure and the sealed pressure, then the state of the hatch cover is designated as "partially open."

A partially open state can occur when the locking bar is removed or broken, which reduces the force applied to the hatch cover. For example, the weight of the hatch cover provides a certain amount of pressure on the seal which is greater than the "open" pressure, but less than the "sealed" pressure.

In an embodiment, when the state of the hatch cover is changed, an alert may be sent indicating that a change in the state of the hatch cover has occurred. For example, if a railcar leaves the terminal with the hatch cover in a sealed state, an alert is generated if the state of the hatch cover is determined to be open or partially open. Alerts may be provided visually, audibly, or a communication may be sent to the shipping company associated with the railcar. In this manner, inadvertent and unauthorized opening of the hatch cover may be detected, and the owner of the shipment notified.

In some embodiments, hatch status device 135 may be communicably coupled to additional or different sensors. As one example, hatch status device 135 may be communicably coupled to a fill level sensor. A fill level sensor may be directed from hatch cover 26 into the container to detect a fill level of the commodity in the container. After the container is loaded, hatch status device 135, based on measurements from the fill level sensor, may store a "full" measurement.

In some embodiments, a fill level sensor comprises an ultrasonic transducer for measuring the fill level in the container. Other embodiments may include any suitable sensor for detecting a quantity of commodity within the container.

Hatch status device 135 may periodically request fill level information from the fill level sensor. In other embodiments, the fill level sensor may periodically and autonomously send pressure information to hatch status device 135. In some embodiments, the fill level sensor may send fill level information to hatch status device 135 upon detecting a change in fill level.

Using the provided fill level information, hatch status device 135 can determine whether the fill level of the commodity in the container has changed (e.g., leak detection). If the fill level changes by a threshold amount, hatch status device 135 may notify the owner of the shipment.

In some embodiments, hatch status device 135 comprises wireless communication circuitry for communication over a wireless network. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards, including Internet-of-Things (IoT), vehicle to vehicle communication (V2V), etc.; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

In some embodiments, a railcar may include multiple hatch status devices 135. For example, a hopper car with two hoppers may include two hatch status devices 135, one for each hopper. In some embodiments, the hatch status devices 135 may be communicably coupled to a gateway via a short range wireless network, such as Bluetooth for example, and the gateway may comprise longer distance wireless communication circuitry for transmitting alarms to a rail operator or shipping company.

Figure 8:
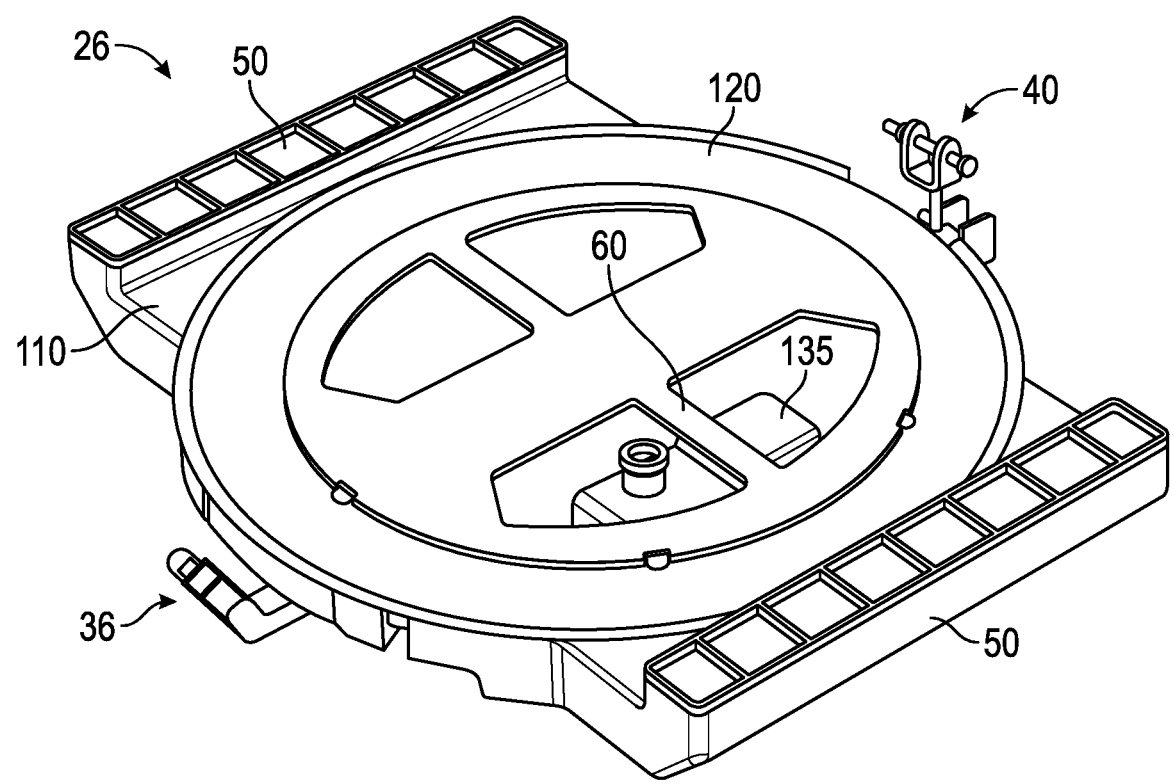
FIG. 8 is another underside perspective view of a hatch cover, according to some embodiments.

FIG. 8 is another underside perspective view of a hatch cover, according to some embodiments. Hatch cover 26 is the hatch cover illustrated in FIG. 7 with seal 120 installed over pressure sensor 125.

Figure 9:
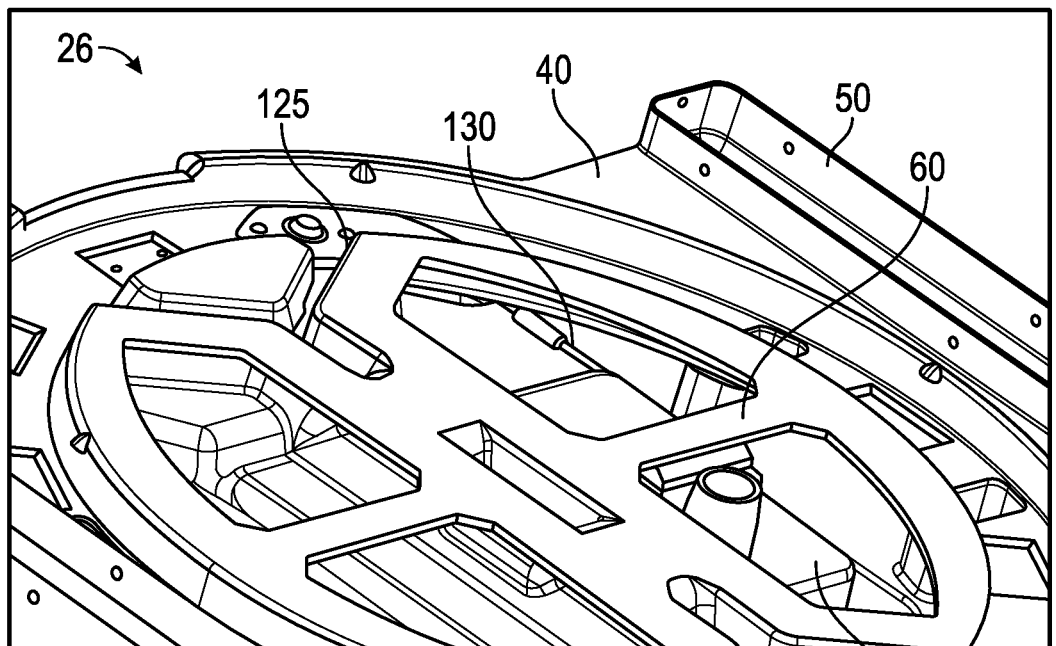
FIG. 9 is a close up perspective view of the underside of a hatch cover, according to some embodiments.

FIG. 9 is a close up perspective view of the underside of a hatch cover, according to some embodiments. Specifically illustrated are hatch status device 135 and sensor 125 with seal 120 removed.

In the illustrated embodiments, pressure sensor 125 is illustrated between seal 120 and body 110. In other embodiments, seal 125 may include pressure sensor 125, or pressure sensor 125 may be positioned in other suitable locations, such as between locking bar 32 and body 110.

In particular embodiments, hatch status device 135 may be coupled to cross-bar member 60. Hatch status device 135 may be coupled to cross-bar member 60 via mechanical fasteners, adhesive, or any combination of fasteners.

Figure 10A:
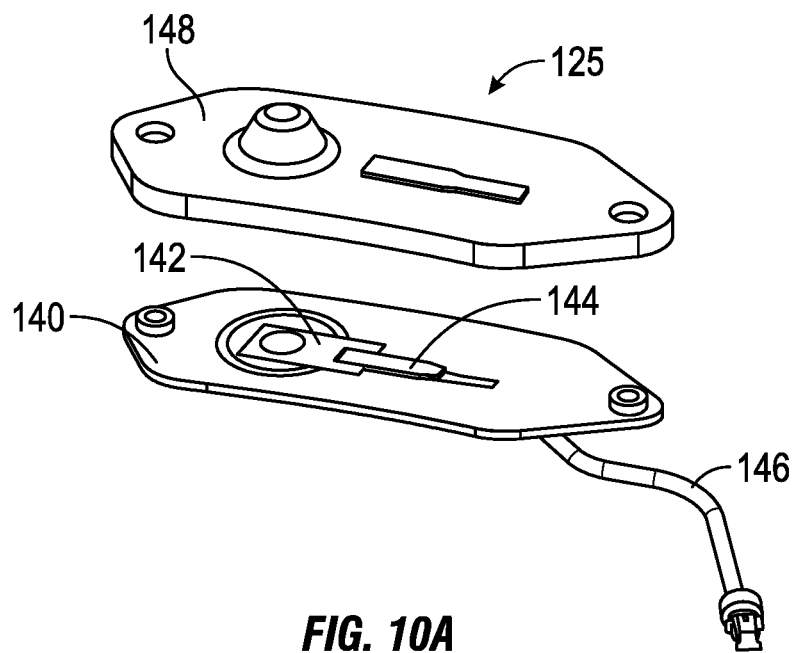
FIGS. 10A and 10B illustrate an example pressure sensor.
Figure 10B:
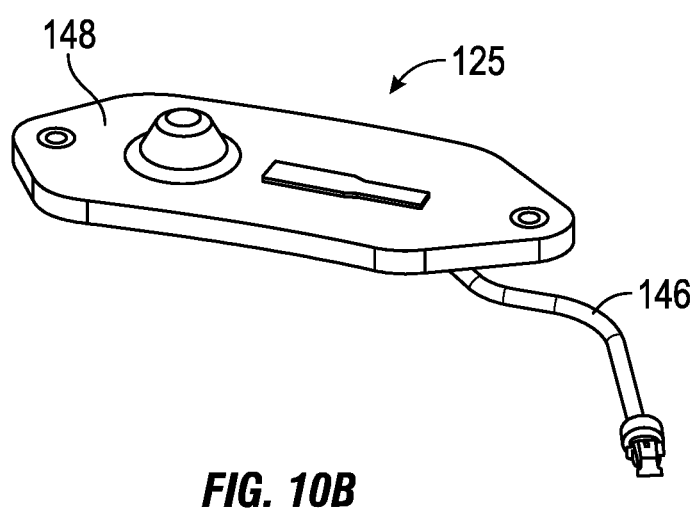

FIGS. 10A and 10B illustrate an example pressure sensor. FIG. 10A is an exploded perspective view of pressure sensor 125 illustrated in FIG. 10B.

Pressure sensor 125 includes base 140, force sensor 142, wiring connector 144, wiring harness 146, and cover 148. Force sensor 142 may comprise a force sensitive resistor (as illustrated), a load cell, or any other sensor suitable for detecting pressure and/or force. Wiring connector 144 and wiring harness 146 communicably couple force sensor 142 to a control unit, such as hatch status device 135. In some embodiments, cover 148 snaps on to base 140 to protect force sensor 142.

Although a particular force sensor is illustrated, some embodiments may include force sensors of various sizes and shapes. Some embodiments may include a ribbon shaped force sensor disposed around all or part of the radius of the hatch cover.

Figure 11:
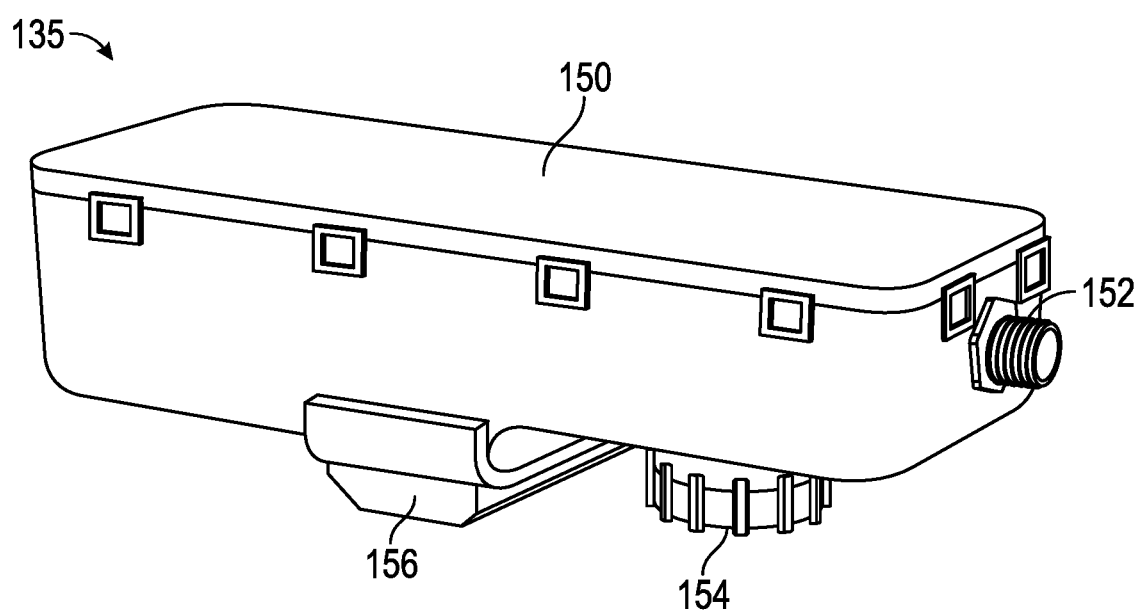
FIG. 11 is a perspective view of a hatch status device, according to a particular embodiment.

FIG. 11 is a perspective view of a hatch status device, according to a particular embodiment. Hatch status device 135 includes enclosure 150, wiring connector 152, fill level sensor protective cover 154, and installation wedge 156.

Enclosure 150 comprises a sealed enclosure to protect the circuitry and wiring of hatch status device 135. Wire connector 152 communicably couples hatch status device 135 to one or more sensors, such as pressure sensors 125. Fill level sensor protective cover 154 provides a protective housing for a fill level sensor, such as an ultrasonic transducer.

Installation wedge 156 is used for mounting enclosure 150 to hatch cover 16, such as via cross-bar member 60 as illustrated in FIGS. 7-9.

Figure 12:
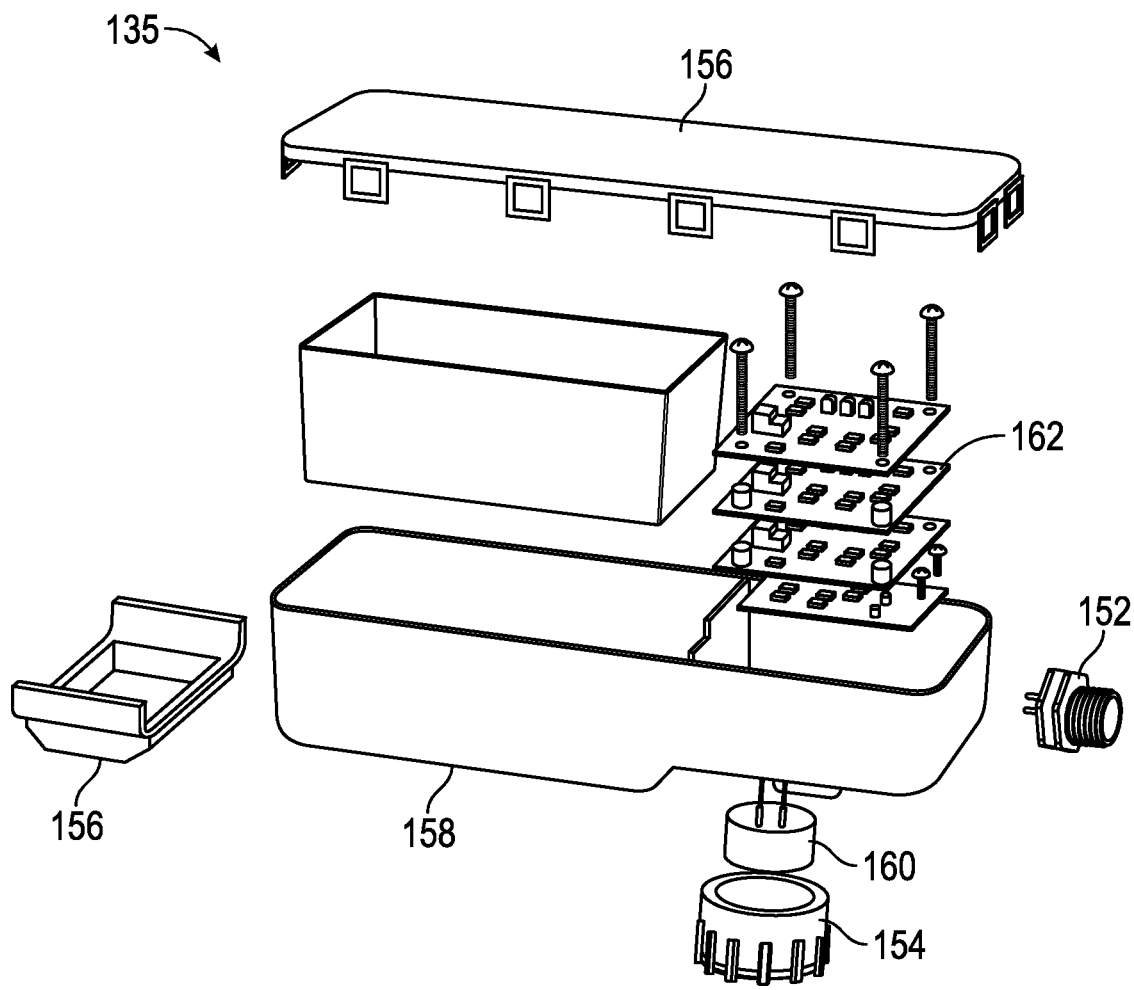
FIG. 12 is an exploded perspective view of a hatch status device, according to a particular embodiment.

FIG. 12 is an exploded perspective view of a hatch status device, according to a particular embodiment. Enclosure 150 comprises bottom enclosure 158 and top enclosure 156. Also illustrated is fill level sensor 160 and processing circuitry 162.

Figure 13:
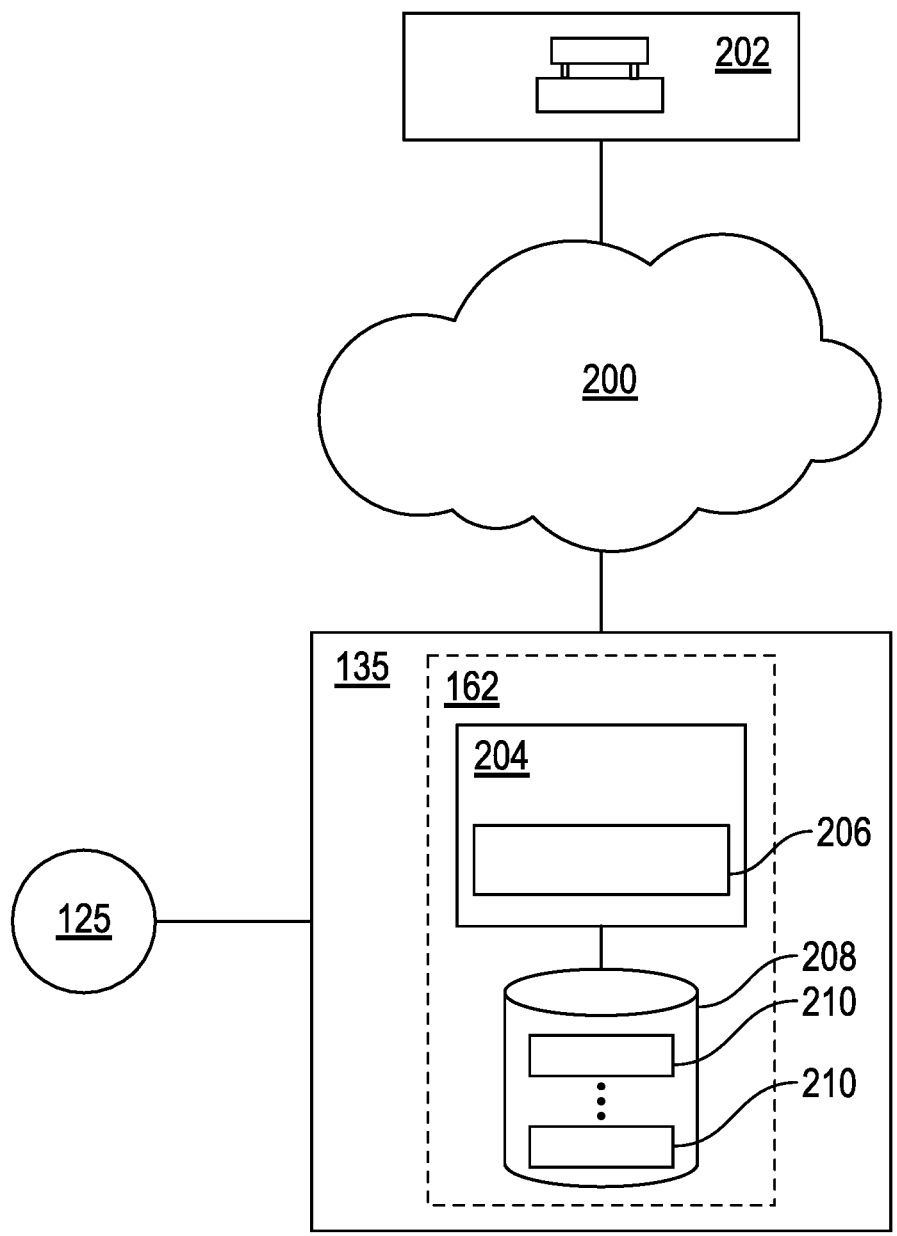
FIG. 13 is a block diagram illustrating components of a hatch status device, according to particular embodiments.

FIG. 13 is a block diagram illustrating components of a hatch status device, according to particular embodiments. Hatch status device 135 is communicably coupled to one or more pressure sensors 125 (or other sensors, such as a fill level sensor). The coupling may be wired or wireless. Hatch status device 135 exchanges measurements and/or commands with sensors 125. Based on the measurements received from sensors 125, hatch status device 135 may detect a problem situation (e.g., open hatch, low fill level, etc.) and notify operations center 202. Hatch status device 135 is communicably coupled to operations center 202 via network 200.

Hatch status device 135 comprises processing circuitry 162. Processing circuitry 162 comprises memory 208 operable to store measurements 210 and instructions 206, and one or more processors 204 coupled to memory 208. One or more processors 204 may be implemented as one or more central processing unit (CPU) chips, logic units, cores (e.g., a multi-core processor), field-programmable gate array (FPGAs), application specific integrated circuits (ASICs), or digital signal processors (DSPs). The one or more processors are configured to implement various instructions 206 to determine a status of a container, such as a status of its hatch cover or status of its contents, and may be implemented in hardware and/or software.

Memory 208 comprises one or more disks, tape drives, or solid-state drives, and may be used as an over-flow data storage device, to store programs when such programs are selected for execution, and to store instructions and data that are read during program execution, such as instructions and logic rules. Memory 208 may be volatile or non-volatile and may comprise read only memory (ROM), random access memory (RAM), ternary content-addressable memory (TCAM), dynamic RAM (DRAM), and/or static RAM (SRAM). Memory 208 may comprise cloud storage. Memory 208 is operable to store, for example, measurements 210.

Network 200 comprises a plurality of network nodes configured to communicate data between hatch status device 135 and operations center 202. Examples of network nodes include, but are not limited to, routers, switches, modems, web clients, and web servers. Network 200 comprises any suitable type of wireless and/or wired network including, but not limited to, all or a portion of the Internet, the public switched telephone network, a cellular network, and/or a satellite network. Network 200 is configured to support any suitable communication protocols as would be appreciated by one of ordinary skill in the art upon viewing this disclosure.

Figure 14:
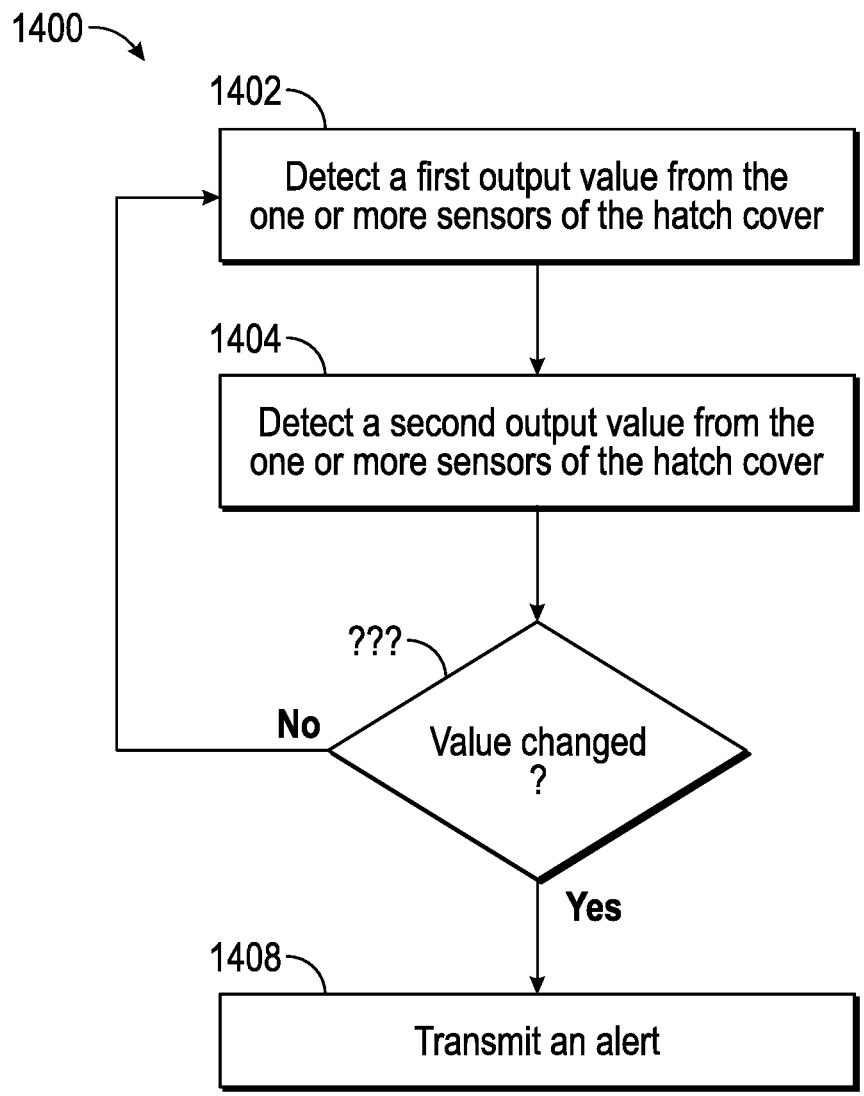
FIG. 14 is a flowchart describing an example method for use with a hatch cover.

FIG. 14 is a flowchart describing an example method for use with a hatch cover. Method 1400 may be performed by hatch status device 135 or any other suitable component described above. The hatch cover comprises one or more sensors (e.g., pressure sensor, fill level sensor, etc.).

At step 1402, the hatch status device detects a first output value from the one or more sensors of the hatch cover. For example, hatch status device 135 may detect a "sealed" pressure for a hatch cover, or a "full" fill level for a container.

At step 1404, the hatch status device detects a second output value from the one or more sensors of the hatch cover. For example, the hatch cover may have come unsealed and hatch status device 135 may detect a "partially open" or "open" pressure for the hatch cover, or the contents of the container may have leaked and hatch status device 135 may detect a less than "full" fill level for the container.

At step 1406, the hatch status device transmitting an alert to a remote location based on the determination that the second output value is different than the first output value. For example, hatch status device 135 may send an alert to operations center 202 that the hatch cover is open or partially open, or an alert that some of the commodity may have leaked from the container.

Modifications, additions, or omissions may be made to the method of FIG. 14. Additionally, one or more steps in method 1400 of FIG. 14 may be performed in parallel or in any suitable order.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of this disclosure.

The invention claimed is:

1. A hatch cover for an opening in a container, the hatch cover comprising:
    a body comprising a plate member for covering the opening in the container;
    a seal on an underside of the body for sealing the body to the container; and
    one or more pressure sensors directly disposed between the seal and the body, wherein the one or more pressure sensors are operable to detect a pressure between the body and the container, and wherein the one or more pressure sensors are communicably coupled to a hatch status device operable to detect a change in pressure between the body and the container indicating whether the hatch cover is open.

2. The hatch cover of claim 1, wherein the hatch status device is operable to transmit pressure information received from the one or more pressure sensors to a remote location.

3. The hatch cover claim 1, wherein the one or more pressure sensors are communicably coupled to the hatch status device via one or more wires.

4. The hatch cover of claim 1, wherein the one or more pressure sensors are communicably coupled wirelessly to the hatch status device.

5. The hatch cover of claim 1, wherein the one or more pressure sensors comprise a force sensitive resistor.

6. The hatch cover of claim 1, further comprising a fill level sensor disposed on the underside of the body and operable to detect a fill level of a commodity within the container, wherein the fill level sensor is communicably coupled to the hatch status device operable to detect a change in the fill level of the container.

7. The hatch cover of claim 6, wherein the fill level sensor comprises an ultrasonic transducer.

8. The hatch cover of claim 1, wherein the container comprises a railcar.

9. A hatch cover for an opening in a container, the hatch cover comprising:
    a body comprising a plate member for covering the opening in the container; and
    a fill level sensor disposed on an underside of the body and operable to detect a fill level of a commodity within the container, wherein the fill level sensor is communicably coupled to a hatch status device operable to detect a change in the fill level of the container, wherein the fill level sensor comprises an ultrasonic transducer.

10. The hatch cover of claim 9, wherein the hatch status device is operable to transmit fill level information received from the fill level sensor to a remote location.

11. The hatch cover of claim 9, wherein the fill level sensor is communicably coupled to the hatch status device via one or more wires.

12. The hatch cover of claim 9, wherein the fill level sensor is communicably coupled wirelessly to the hatch status device.

13. The hatch cover of claim 9, further comprising:
a seal on the underside of the body for sealing the body to the container; and
one or more pressure sensors disposed between the seal and the body, wherein the one or more pressure sensors are operable to detect a pressure between the body and the container, and wherein the one or more pressure sensors are communicably coupled to the hatch status device operable to detect a change in pressure between the body and the container.

14. The hatch cover of claim 13, wherein the one or more pressure sensors comprise a force sensitive resistor.

15. The hatch cover of claim 9, wherein the container comprises a railcar.

16. A method for use with a hatch cover for an opening in a container, the hatch cover comprising one or more sensors, the method comprising:
detecting a first output value from the one or more sensors of the hatch cover;
detecting a second output value from the one or more sensors of the hatch cover;
determining the second output value is different than the first output value; and
transmitting an alert to a remote location based on the determination that the second output value is different than the first output value.

17. The method of claim 16, wherein:
the one or more sensors comprise a pressure sensor disposed between the hatch cover and the container, and
determining the second output value is different than the first output value comprises determining a first pressure value is greater than a second pressure value by a first threshold amount; and
the alert comprises an alert that the hatch cover is partially open.

18. The method of claim 16, wherein:
the one or more sensors comprise a pressure sensor disposed between the hatch cover and the container, and
determining the second output value is different than the first output value comprises determining a first pressure value is greater than a second pressure value by a second threshold amount; and
the alert comprises an alert that the hatch cover is open.

19. The method of claim 16, wherein:
the one or more sensors comprise a fill level sensor disposed between the hatch cover and the container, and
determining the second output value is different than the first output value comprises determining a first fill level value is greater than a second fill level value by a second threshold amount; and
the alert comprises an alert that a fill level of the container is decreased.

* * * * *